(12) United States Patent
Wang et al.

(10) Patent No.: US 10,997,980 B2
(45) Date of Patent: May 4, 2021

(54) SYSTEM AND METHOD FOR DETERMINING VOICE CHARACTERISTICS

(71) Applicant: ALIPAY (HANGZHOU) INFORMATION TECHNOLOGY CO., LTD., Zhejiang (CN)

(72) Inventors: Zhiming Wang, Hangzhou (CN);
Kaisheng Yao, Hangzhou (CN);
Xiaolong Li, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/081,956

(22) Filed: Oct. 27, 2020

(65) Prior Publication Data
US 2021/0043216 A1    Feb. 11, 2021

Related U.S. Application Data

(63) Continuation of application No. PCT/CN2019/114812, filed on Oct. 31, 2019.

(51) Int. Cl.
*G10L 17/04* (2013.01)
*G10L 17/02* (2013.01)
*G10L 17/18* (2013.01)

(52) U.S. Cl.
CPC .............. *G10L 17/04* (2013.01); *G10L 17/02* (2013.01); *G10L 17/18* (2013.01)

(58) Field of Classification Search
CPC .......... G10L 17/04; G10L 17/02; G10L 17/18
USPC ........................................................ 704/275
See application file for complete search history.

(56) References Cited

U.S. PATENT DOCUMENTS

| | | | |
|---|---|---|---|
| 5,640,429 A * | 6/1997 | Michels | G01S 7/292 342/378 |
| 6,519,561 B1 | 2/2003 | Farrell et al. | |
| 6,609,093 B1 * | 8/2003 | Gopinath | G06K 9/6234 382/190 |

(Continued)

FOREIGN PATENT DOCUMENTS

| CN | 103310788 A | 9/2013 |
|---|---|---|
| CN | 105869630 A | 8/2016 |

(Continued)

OTHER PUBLICATIONS

PCT International Search Report and the Written Opinion dated Jul. 27, 2020, issued in related International Application No. PCT/CN2019/114812 (6 pages).

(Continued)

*Primary Examiner* — Edwin S Leland, III (57) ABSTRACT

Methods, systems, and apparatus, including computer programs encoded on computer storage media, for determining voice characteristics are provided. One of the methods includes: obtaining speech data of a speaker; inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix; and obtaining from the trained model one or more voice characteristics of the speaker.

20 Claims, 6 Drawing Sheets

(56) References Cited

U.S. PATENT DOCUMENTS

| | | | | |
|---|---|---|---|---|
| 8,527,276 | B1* | 9/2013 | Senior | G06N 3/084 704/259 |
| 9,824,692 | B1 | 11/2017 | Khoury et al. | |
| 9,967,218 | B2* | 5/2018 | Chu | H04L 51/12 |
| 10,347,241 | B1* | 7/2019 | Meng | G10L 15/063 |
| 2008/0205624 | A1* | 8/2008 | Mandalia | H04M 3/51 379/265.02 |
| 2009/0157571 | A1* | 6/2009 | Smith | G06K 9/6292 706/12 |
| 2010/0138222 | A1* | 6/2010 | Herbig | G10L 15/065 704/243 |
| 2010/0223057 | A1* | 9/2010 | Capman | G10L 17/08 704/250 |
| 2012/0095764 | A1* | 4/2012 | Jeon | G10L 15/1822 704/246 |
| 2012/0263285 | A1* | 10/2012 | Rajakumar | G10L 17/00 379/189 |
| 2013/0225128 | A1* | 8/2013 | Gomar | H04W 12/06 455/411 |
| 2013/0242129 | A1* | 9/2013 | Harmeling | G06T 5/001 348/222.1 |
| 2014/0222423 | A1* | 8/2014 | Cumani | G10L 17/02 704/234 |
| 2014/0222428 | A1* | 8/2014 | Cumani | G10L 17/02 704/250 |
| 2015/0127342 | A1* | 5/2015 | Sharifi | G10L 25/51 704/239 |
| 2015/0206544 | A1* | 7/2015 | Carter | G10L 25/87 704/235 |
| 2016/0253519 | A1* | 9/2016 | Broumas | G06F 21/6245 713/189 |
| 2017/0092264 | A1* | 3/2017 | Hakkani-Tur | G06F 40/30 |
| 2018/0039888 | A1 | 2/2018 | Ge et al. | |
| 2018/0082691 | A1 | 3/2018 | Khoury et al. | |
| 2018/0158463 | A1 | 6/2018 | Ge et al. | |
| 2018/0197547 | A1* | 7/2018 | Shi | G06F 17/17 |
| 2018/0268810 | A1* | 9/2018 | Bangalore | G10L 15/183 |
| 2019/0286980 | A1* | 9/2019 | Backhus | G06N 3/084 |
| 2020/0286468 | A1* | 9/2020 | Bengio | G10L 15/02 |
| 2020/0320660 | A1* | 10/2020 | Kamath | G06N 3/0454 |
| 2020/0327675 | A1* | 10/2020 | Lin | G06T 7/13 |

FOREIGN PATENT DOCUMENTS

| | | |
|---|---|---|
| CN | 106991312 A | 7/2017 |
| CN | 109065022 A | 12/2018 |
| CN | 109256139 A | 1/2019 |
| CN | 110223699 A | 9/2019 |
| WO | 99-23643 A1 | 5/1999 |
| WO | 2019-161011 A1 | 8/2019 |

OTHER PUBLICATIONS

PCT International Search Report and the Written Opinion dated Aug. 6, 2020, issued in related International Application No. PCT/CN2020/071194 (8 pages).

Arsha Nagrani, Joon Son Chung, and Andrew Zisserman, "Voxceleb: a large-scale speaker identification dataset," in Proc. Interspeech 2017.

N. Dehak, P. Kenny, R. Dehak, P Dumouchel, and P. Ouellet, "Front-end factor analysis for speaker verification," IEEE Trans. on Audio, Speech, and Language Processing, vol. 19, No. 4, 2011.

David Snyder, Daniel Garcia-Romero, Daniel Povey, and Sanjeev Khudanpur, "Deep neural network embeddings for text-independent speaker verification," in Proc. Interspeech 2017.

Vid Snyder, Daniel Garcia-Romero, Gregory Sell, Daniel Povey, and Sanjeev Khudanpur, "X-vectors: Robust dnn embeddings for speaker recognition," in IEEE International Conference on Acoustics, Speech and Signal Processing (ICASSP), 2018.

Koji Okabe, Takafumi Koshinaka, and Koichi Shinoda, "Attentive statistics pooling for deep speaker embedding," in Proc. Interspeech 2018.

Weidi Xie, Arsha Nagrani, Joon Son Chung, and Andrew Zisserman, "Utterance-level aggregation for speaker recognition in the wild," in IEEE International Conference on Acoustics, Speech and Signal Processing (ICASSP), 2019.

Yi Liu, Liang He, Jia Liu, and Michael T Johnson, "Speaker embedding extraction with phonetic information," in Proc. Interspeech 2018.

Jinyu Li Zhong Meng, Yong Zhao and Yifan Gong, "Adversarial speaker verification," in IEEE International Conference on Acoustics, Speech and Signal Processing (ICASSP), 2019.

Lantian Li, Zhiyuan Tang, Ying Shi, and Dong Wang, "Gaussian-constrained training for speaker verification," in IEEE International Conference on Acoustics, Speech and Signal Processing (ICASSP), 2019.

Chao Li, Xiaokong Ma, Bing Jiang, Xiangang Li, Xuewei Zhang, Xiao Liu, Ying Cao, Ajay Kannan, and Zhenyao Zhu, "Deep speaker: an end-to-end neural speaker embedding system," arXiv preprint arXiv:1705.02304, 2017.

Na Li, Deyi Tuo, Dan Su, Zhifeng Li, and Dong Yu, "Deep discriminative embeddings for duration robust speaker verification," in Proc. Interspeech 2018.

Joon Son Chung, Arsha Nagrani, and Andrew Zisserman, "Voxceleb2: Deep speaker recognition," in Proc. Interspeech 2018.

Yandong Wen, Kaipeng Zhang, Zhifeng Li, and Yu Qiao, "A discriminative feature learning approach for deep face recognition," in European Conference on Computer Vision(ECCV). Springer, 2016.

Weiyang Liu, Yandong Wen, Zhiding Yu, Ming Li, Bhiksha Raj, and Le Song, "Sphereface: Deep hypersphere embedding for face recognition," in IEEE Conference on Computer Vision and Pattern Recognition (CVPR), 2017.

Feng Wang, Jian Cheng, Weiyang Liu, and Haijun Liu, "Additive margin softmax for face verification," IEEE Signal Processing Letters, vol. 25, No. 7, 2018.

Jiankang Deng, Jia Guo, Niannan Xue, and Stefanos Zafeiriou, "Arcface: Additive angular margin loss for deep face recognition," arXiv preprint arXiv:1801.07698, 2018.

Sergey Ioffe, "Probabilistic linear discriminant analysis," in European Conference on Computer Vision (ECCV), Springer, 2006.

WeitaoWan, Yuanyi Zhong, Tianpeng Li, and Jiansheng Chen, "Rethinking feature distribution for loss functions in image classification," in IEEE Conference on Computer Vision and Pattern Recognition (CVPR), 2018.

Patrick Kenny, Themos Stafylakis, Pierre Ouellet, Md Jahangir Alam, and Pierre Dumouchel, "Plda for speaker veritication with utterances of arbitrary duration," in IEEE International Conference on Acoustics, Speech and Signal Processing (ICASSP), 2013.

Ye Jiang, Kong Aik Lee, and Longbiao Wang, "Plda in the i-supervector space for text-independent speaker verification," EURASIP Journal on Audio, Speech, and Music Processing, vol. 2014, No. 1.

Mahdi Hajibabaei and Dengxin Dai, "Unified hypersphere embedding for speaker recognition," arXiv preprint arXiv:1807.08312, 2018.

Weiyang Liu, Yandong Wen, Zhiding Yu, and Meng Yang, "Large-margin softmax loss for convolutional neural networks," in International Conference on Machine Learning(ICML), 2016, vol. 2.

Kaiming He, Xiangyu Zhang, Shaoqing Ren, and Jian Sun, "Deep residual learning for image recognition," in IEEE Conference on Computer Vision and Pattern Recognition (CVPR), 2016.

Xavier Glorot and Yoshua Bengio, "Understanding the difficulty of training deep feedforward neural networks," in Proceedings of the thirteenth international conference on artificial intelligence and statistics, 2010.

Weicheng Cai, Jinkun Chen, and Ming Li, "Exploring the encoding layer and loss function in end-to end speaker and language recognition system," arXiv preprint arXiv:1804.05160, 2018.

Ya-Qi Yu, Lei Fan, and Wu-Jun Li, "Ensemble additive margin softmax for speaker verification," in IEEE International Conference on Acoustics, Speech and Signal Processing (ICASSP), 2019.

Non-Final Office Action for U.S. Appl. No. 17/131,182 dated Feb. 23, 2021.

* cited by examiner

SYSTEM AND METHOD FOR DETERMINING VOICE CHARACTERISTICS

CROSS REFERENCE TO RELATED APPLICATION

The present application is a continuation application of International Patent Application No. PCT/CN2019/114812, filed on Oct. 31, 2019, and entitled "SYSTEM AND METHOD FOR DETERMINING VOICE CHARACTERISTICS", the entire contents of which are incorporated herein by reference.

TECHNICAL FIELD

This application generally relates to systems and methods for determining voice characteristics.

BACKGROUND

Many applications are developed based on human voice characteristics. For example, users can be authenticated according to their voices. To that end, machine learning algorithms such as deep learning have been proposed to train computer systems to recognize human voices. Deep learning, also known as deep neural network (DNN), is a subset of machine learning in artificial intelligence that has networks capable of learning from data that is unstructured (which can be labeled or unlabeled).

Such machine learning algorithms often involve trying to assign subjects (e.g., speakers) to classes (e.g., identities). To improve the performance of computer systems determining voice characteristics based on human voices, it is desirable to maximize between-class differences and minimize intra-class differences. That is, in the outputs of the algorithms, subjects in each class shall be as similar as possible, and subjects in different classes shall be as different as possible.

SUMMARY

Various embodiments of the specification include, but are not limited to, systems, methods, and non-transitory computer readable media for determining voice characteristics.

According to some embodiments, a computer-implemented method for determining voice characteristics comprises: obtaining speech data of a speaker; inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix; and obtaining from the trained model one or more voice characteristics of the speaker.

In some embodiments, training the model by minimizing the first loss function optimizes speaker classification; and training the model by minimizing the second loss function optimizes speaker clustering.

In some embodiments, the non-unit multi-variant covariance matrix comprises a standard deviation diagonal matrix.

In some embodiments, the Gaussian mixture loss function with non-unit multi-variant covariance matrix comprises a large margin Gaussian mixture loss function.

In some embodiments, the non-sampling-based loss function comprises an additive margin softmax loss function.

In some embodiments, the first loss function acts as a regularizer to the second loss function; and the second loss function acts as a regularizer to the first loss function.

In some embodiments, the method further comprises: obtaining the one or more voice characteristics for each of one or more speakers; obtaining the one or more voice characteristics for a candidate user; comparing the one or more voice characteristics of the candidate user with the one or more characteristics of the each of the one or more speakers; and identifying whether the candidate user is any of the one or more speakers based at least on the comparison.

In some embodiments, the method further comprises: obtaining the one or more voice characteristics for a candidate user; comparing the one or more voice characteristics of the candidate user with the one or more characteristics of the speaker; and verifying whether the candidate user is the speaker based at least on the comparison.

In some embodiments, comparing the one or more voice characteristics of the candidate user with the one or more characteristics of the each of the one or more speakers comprises: comparing, with a threshold, a distance between a vector representing the one or more voice characteristics of the candidate user and a different vector representing the one or more characteristics of the each of the one or more speakers.

In some embodiments, obtaining the speech data of the speaker comprises obtaining a spectrogram corresponding to the speech data, and obtaining a plurality of feature vectors corresponding to the spectrogram; and inputting the speech data into the trained model comprises inputting the plurality of feature vectors into the trained model.

In some embodiments, the trained model comprises: a first convolution layer configured to receive the plurality of feature vectors as an input of the first convolution layer; a first pooling layer configured to receive an output of the first convolution layer as an input of the first pooling layer; a plurality of residual network layers configured to receive an output of the first pooling layer as an input of the plurality of residual network layers; a second convolution layer configured to receive an output of the plurality of residual network layers as an input of the second convolution layer; a second pooling layer configured to receive an output of the second convolution layer as an input of the second pooling layer; and an embedding layer configured to receive an output of the second pooling layer as an input of the embedding layer and output a vector representing the one or more voice characteristics of the speaker.

In some embodiments, minimizing the first loss function comprises, for at least the embedding layer, minimizing a non-sampling-based loss function to optimize between-class classification error; and minimizing the second loss function comprises, for at least the embedding layer, minimizing a Gaussian mixture loss function with non-unit multi-variant covariance matrix to reduce intra-class variation.

In some embodiments, minimizing the first loss function comprises increasing a margin linearly from zero to a target margin value for annealing.

According to other embodiments, a system for determining voice characteristics comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for determining voice characteristics comprises a plurality of modules for performing the method of any of the preceding embodiments.

According to some embodiments, a system for determining voice characteristics comprises one or more processors and one or more non-transitory computer readable storage media storing instructions executable by the one or more processors to cause the one or more processors to perform operations comprising: obtaining speech data of a speaker; inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix; and obtaining from the trained model one or more voice characteristics of the speaker.

According to other embodiments, a non-transitory computer-readable storage medium is configured with instructions executable by one or more processors to cause the one or more processors to perform operations comprising: obtaining speech data of a speaker; inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix; and obtaining from the trained model one or more voice characteristics of the speaker.

According to yet other embodiments, an apparatus for determining voice characteristics comprises a first obtaining module for obtaining speech data of a speaker; an inputting module for inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix; and a second obtaining module for obtaining from the trained model one or more voice characteristics of the speaker.

Embodiments disclosed herein have one or more technical effects. In some embodiments, two loss functions respectively optimizing between-class separability and intra-class variability are jointly employed. In one embodiment, a non-sampling-based loss function is employed for optimizing between-class separability, and a Gaussian mixture loss with non-unit multi-variant covariance matrix is employed for reducing intra-class variation. This combination not only improves the generalization capability of classification using margin-based methods, but also explicitly reduces intra-class variability. In one embodiment, optimization for both between-class separability and intra-class variability achieves better performance (e.g., faster and better convergence) than optimization for class separability or intra-class variability alone. In one embodiment, an end-to-end framework is provided to train the disclosed model through minimizing the two loss functions. In some embodiments, with the joint optimization, the learned embeddings capture segment-level acoustic representation from variable-length speech segments to discriminate between speakers and to replicate densities of speaker clusters. In some embodiments, joint optimization of classification and clustering facilitates speaker verification and identification. In one embodiment, greater similarities for subjects in the same class and greater differences for subjects in different classes may be realized, making the determined voice characteristics more accurate. In one embodiment, the optimization for intra-class variability improves the process of voice characteristics determination by accommodating the possibility that speaker embeddings are distributed with multiple shapes and modes. In one embodiment, to optimize for between-class separability, an annealing method is provided to train additive margin softmax loss stably.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Voice characteristics as personal traits have potential for various applications. Voice characteristics may include one or more of: volume, pitch, intonation (rising or falling pitch), tone, duration, speech rate, loudness, and the like. Each person may have one or more unique voice characteristics to distinguish from other people. In one example, speaker verification may authenticate speaker identity given enrolled voice characteristics of the speaker and some speech utterances as trials. Speaker verification outputs a binary decision of acceptance or rejection of unidentified speech utterances as associated with the speaker. In another application example, speaker identification differs from speaker verification in that the speaker has to be identified given the speech utterances, and its output is the speaker's identity from a set of speakers.

Voice characteristics may or may not be speech-based. Thus, speaker verification and speaker identification systems can be further categorized as text-independent or text-dependent. A text-independent system does not fix content of the utterances to some lexical phrases, in contrast to a text-dependent system. In one example, for a text-dependent system, all users have to utter the same preset phrase to be recognized based on their voices; but for a text-independent system, the users can utter different phrases or voices and still be recognized.

Various methods have been proposed to obtain real-valued, compact, and low-dimensional vectors to represent speaker characteristics using deep leaning. Deep learning is a subset of machine learning in artificial intelligence that has networks capable of learning from data that is unstructured or unlabeled. Deep learning can be supervised, semi-supervised, or unsupervised. Recent works attempt to incorporate a variety of loss functions, such as triplet loss, center loss, and contrastive loss to train speaker embeddings set of high-level feature representations through deep learning). For example, loss functions may be applied on positive samples of speech utterances belonging to their associated speaker and negative samples of speech utterances not associated with the speaker. For another example, center loss may be measured as the Euclidean loss between speaker embeddings and their centers. Improvements are yet to be made to enhance the applicability of voice characteristics.

Embodiments described herein provide methods, systems, and apparatus for determining voice characteristics. Two loss functions respectively optimizing for between-class separability and intra-class variability may be jointly employed. In some embodiments, to reduce classification errors, a non-sampling-based loss function is employed for optimizing between-class separability, and a Gaussian mixture loss with non-unit multi-variant covariance matrix is employed for reducing intra-class variation. The determined voice characteristics may be provided for user verification, user identification, or other applications.

Figure 1:
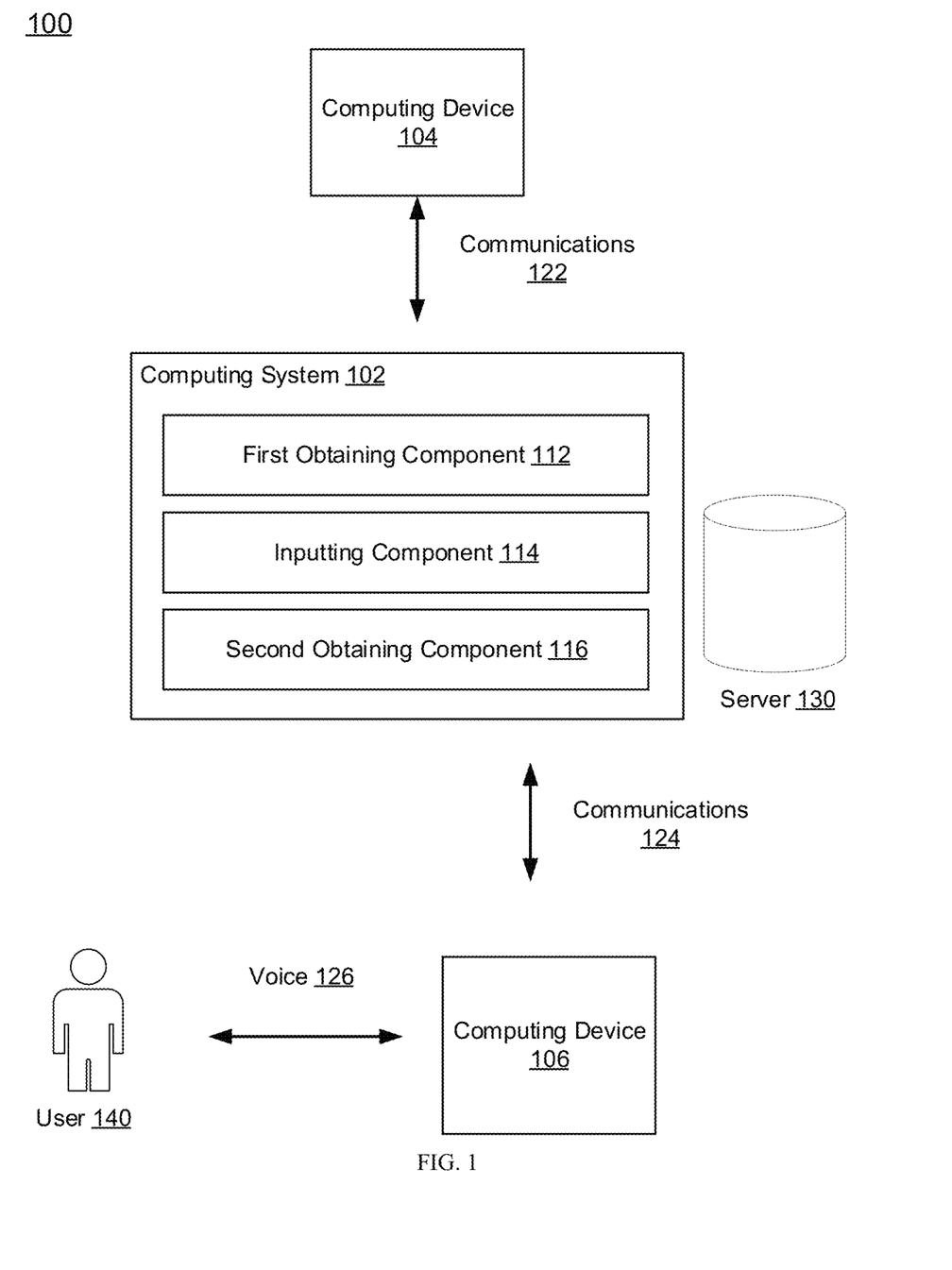
FIG. 1 illustrates a system for determining voice characteristics in accordance with some embodiments.

FIG. 1 illustrates a system 100 for determining voice characteristics in accordance with some embodiments. The components of the system 100 presented below are intended to be illustrative. Depending on the implementation, the system 100 may include additional, fewer, or alternative components.

In some embodiments, the system 100 may include a computing system 102, a computing device 104, and a computing device 106. It is to be understood that although two computing devices are shown in FIG. 1, any number of computing devices may be included in the system 100. The computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices which are distributed across a network.

In some embodiments, the computing system 102 may include a first obtaining component 112, an inputting component 114, and a second obtaining component 116. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

In some embodiments, the computing devices 104 and 106 may be implemented on or as various devices such as a mobile phone, tablet, server, desktop computer, and laptop computer. The computing system 102 may communicate with the computing devices 104 and 106, and other computing devices. Communication between devices may occur over the internet, through a local network (e.g., LAN), through direct communication (e.g., BLUETOOTH™, radio frequency, infrared), etc. In one embodiment, the computing device 104 or 106 may comprise or be associated with a microphone or an alternative device configured to record speech data (e.g., human voices). A user may speak within the detection range of the microphone for the audio capture.

In some embodiments, the system 100 may include a voice characteristics determination platform. For example, the computing system 102 and/or other computing devices may implement the voice characteristics determination platform. The voice characteristics determination platform may train a model for determining voice characteristics and effectuate its applications. For example, the platform may obtain training data from various sources, such as the computing device 104, through communications 122. The computing device 104 may have recorded or stored speech data of one or more speakers. The platform may train a machine learning model with the training data to obtain a trained model. The trained model may be deployed in a remote server, cloud, client-side device, etc. For example, the computing device 106 may be installed with a software application, a web application, an Application Program Interface (API), or another suitable interface for invoking the trained model deployed in the computing device 106 or in the server 130 through communications 124.

The computing devices 104 and 106 may each be associated with one or more users. In some embodiments, a user 140 may interact with the computing device 106, through which the trained model is invoked. For example, by speaking to a microphone coupled to the computing device 104, the user 140 may provide speech data (e.g., voice 126) to the computing device 106, which inputs the speech data into the trained model to verify the user 140, identify the user 140, or perform another application based on voice characteristics.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. For example, the computing system 102 may incorporate the computing device 106, or vice versa. That is, each of the first obtaining component 112, inputting component 114, and second obtaining component 116 may be implemented in the computing system 102 or the computing device 106. Similarly, the computing system 102 may couple to and associate with one or more other computing devices that effectuate a portion of the components or functions of the computing system 102. The computing device 106 may comprise one or more processors and one or more memories coupled to the processors configured with instructions executable by one or more processors to cause the one or more processors to perform various steps described herein.

The various components of the system 100 may be configured to perform steps for determining voice characteristics. In some embodiments, the first obtaining component 112 may be configured to obtain speech data of a speaker. In some embodiments, to obtain the speech data of the speaker, the first obtaining component 112 may be configured to obtain a spectrogram corresponding to the speech data, and obtain a plurality of feature vectors corresponding to the spectrogram.

Figure 2A:
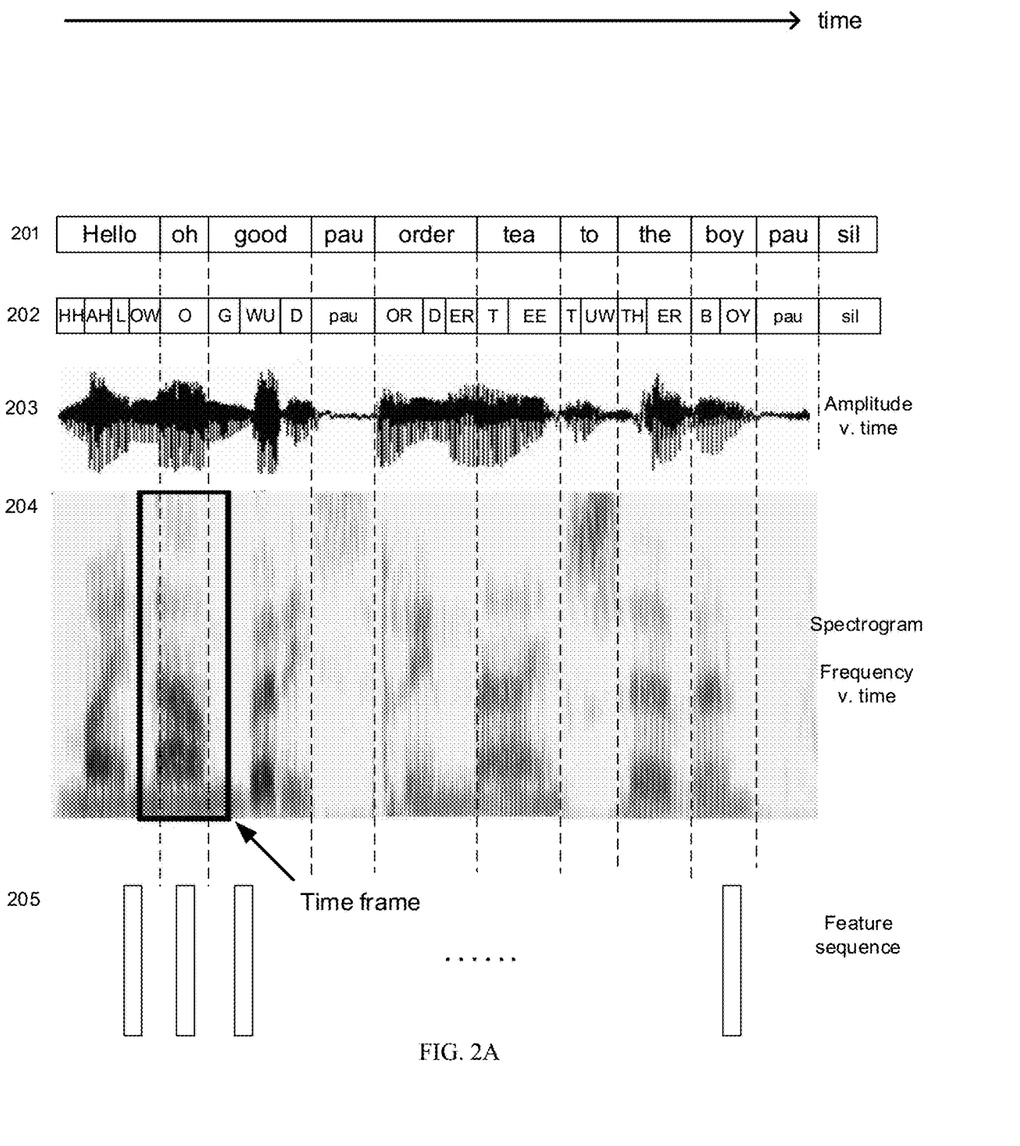
FIG. 2A illustrates a method for obtaining feature vectors in accordance with some embodiments.

Referring to FIG. 2A, FIG. 2A illustrates a method for obtaining feature vectors in accordance with some embodiments. The method may be performed by the computing device 106 and/or the computing system 102. In some embodiments, audio queue 201 may represent an example of speech data of a speaker (e.g., the user 140) captured by the computing device 106. The audio queue 201 is labelled with corresponding blocks of speech words, pauses (pau), or silences (sil) in a continuous time series in the x-axis direction. Vertical dash lines in the figure may mark the same timestamps on various illustrations and indicate the corresponding relationship among them. Depending on the application, the audio queue 201 may or may not be required to contain certain text-dependent trigger phrases.

In some embodiments, audio queue 202 is an alternative representation of the audio queue 201, by breaking down the words into language units. There may be many classifications and definitions of language units, such as phonemes, phoneme portions, triphone, word, and n-gram. The language units shown are merely examples. In one example, phonemes are groups of speech sounds that have a unique meaning or function in a language, and may be the smallest meaningful contrastive unit in the phonology of a language. The number of phonemes may vary for different languages, with most languages having 20-40 phonemes. In one example, "hello" can be separated into language units/phonemes "hh," "ah," "l," and "ow."

In some embodiments, spectrum 203 may represent the speech data (e.g., the audio queue 201). There may be various different representations of the audio. In one example, the spectrum 203 may show the amplitude of captured sound with respect to time.

In some embodiments, spectrogram 204 may be obtained based at least on the spectrum 203. The spectrogram 204 may be a frequency versus time representation of the speech data. In one embodiment, a Fourier transform may be applied to the spectrum 203 to obtain the spectrogram 204. In the spectrogram 204, the amplitude information is displayed in a greyscale as dark and bright regions. Bright regions may indicate that no sound was captured (e.g., pause, silence) at the corresponding time at the corresponding frequency, and dark regions may indicate the presence of sound. Based on the variation of the dark and bright patterns in the x-axis direction, boundaries between language units (e.g., words, phones) may be determined. Further, the pattern of dark regions in the y-axis direction between two dash lines may indicate the various frequencies captured at the corresponding time period and can provide information of the formants (carrying the identity of the sound) and transitions to help determine the corresponding phones.

In some embodiments, a feature sequence 205 may be obtained based at least on the spectrogram 204. In one embodiment, cepstral analysis may be applied to the spectrogram 204 to obtain the feature sequence 205. For example, a time frame may move along the x-axis and sample the spectrogram 204 frame by frame. The speech data may thus be converted to a series of feature vectors shown as rectangular blocks in the figure. In one embodiment, short time spectrograms may be generated within a sliding Hamming window with width 25 ms, step size 10 ms and 1024-point FFT (fast Fourier transform). Mean and variance normalization may be performed along the frequency axis. 300-frame crop of audio speech data may be randomly sampled from each utterance for training that cover 3.015 seconds of speech and give spectrograms of size 300×512, i.e., 300-dimension temporal and 512-dimension frequency feature. A person skilled in the art would appreciate the application of other techniques to obtain the feature vectors. These feature vectors may be used to train a model, or be passed to a trained model for implementing various applications.

Figure 2B:
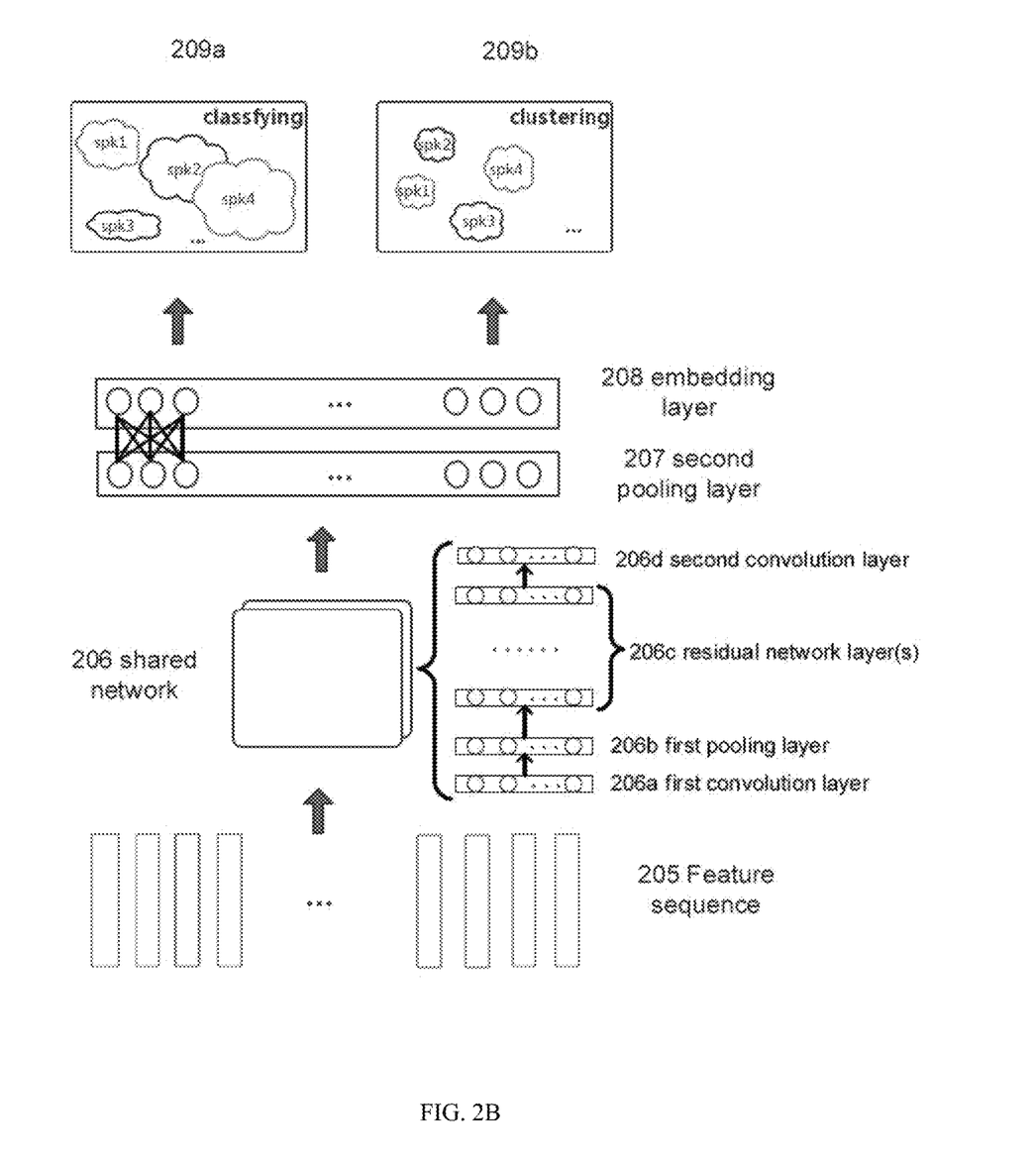
FIG. 2B illustrates a method for training a model for determining voice characteristics in accordance with some embodiments.

Referring to FIG. 2B, FIG. 2B illustrates a method for training a model for determining voice characteristics in accordance with some embodiments. In some embodiments, as shown, the model may be a deep learning model comprising a plurality of layers. As a subset of machine learning, deep learning may utilize a hierarchical level of artificial neural networks to carry out the process of machine learning. The hierarchical function of deep learning systems enables machines to process data with a nonlinear approach. The artificial neural networks are built like the human brain, with neuron nodes connected together like a web. An artificial neural network is based on a collection of connected units or nodes called artificial neurons (represented by circles in various layers such as layers 207 and 208 in this figure), which loosely model the neurons in a biological brain. Each connection, like the synapses in a biological brain, can transmit a signal to other neurons. An artificial neuron that receives a signal then processes it and can signal other neurons connected to it. The signal at a connection may be a real number, and the output of each neuron may be computed by some non-linear function of the sum of its inputs. The connections are called edges (represented by connecting lines such as those between layers 207 and 208 in this figure). Neurons and edges typically have a weight that adjusts as learning proceeds. The weight increases or decreases the strength of the signal at a connection. Neurons may have a threshold such that a signal is sent only if the aggregate signal crosses that threshold. Neurons are aggregated into layers. Since each layer comprises a plurality of neurons, neighboring layers are connected by various neuron-to neuron connections with associated weights. Different layers may perform different transformations on their inputs. Signals travel from the first layer (the input layer) to the last layer (the output layer), possibly after traversing the layers one or more times.

In some embodiments, as an overview of FIG. 2B, a DNN can be used as feature extractor for taking the cepstral acoustic features (e.g., feature sequence 205) as its input, uses several layers of frame-level forward or convolution operations, and then after a pooling layer, outputs a segment-level representation known as embedding. A combination of classification and clustering loss is used to train embeddings. With the embedding, a softmax classifier with a projection from embedding to speaker IDs may be used to distinguish different speakers. Also, an annealing scheme uses margin in the classification loss to improve generalization capability of the trained embedding and make the training process more stable. Since different speakers may result in different Gaussians distributions with different means and standard deviations, reflecting the distinctiveness of human voices, the trained embeddings may be distributed in mixture of Gaussians with multiple shapes and modes. To drive the trained embeddings towards this distribution, the clustering loss is applied. Further details of the model are described below.

In some embodiments, the trained or untrained model may include a plurality of neuron layers outputting from one to a next, forming the DNN. The plurality of neuron layers may comprise, for example, a ResNet-34 (34-layer residual network) architecture, ResNet-50 architecture, etc. For example, the plurality of layers may include: a first convolution layer 206a configured to receive the plurality of feature vectors (e.g., the feature sequence 205) as an input of the first convolution layer 206a; a first pooling layer 206b configured to receive an output of the first convolution layer 206a as an input of the first pooling layer 206b; a plurality of residual network layers 206c configured to receive an output of the first pooling layer 206b as an input of the plurality of residual network layers 206c; a second convolution layer 206d configured to receive an output of the plurality of residual network layers 206c as an input of the second convolution layer 206d; a second pooling layer 207 configured to receive an output of the second convolution layer 206d as an input of the second pooling layer 207; and an embedding layer 208 configured to receive an output of the second pooling layer 207 as an input of the embedding layer 208 and output a vector representing the one or more voice characteristics of the speaker. The first convolution layer 206a may be the input layer, and the embedding layer 208 may be the output layer. The first convolution layer 206a, the first pooling layer 206b, the plurality of residual network layers 206c, and the second convolution layer 206d may be referred to a shared network 206.

An embedding is a mapping of a discrete variable to a vector of continuous numbers. In some embodiments, through the embedding layer 208, words or phrases of the speech data input may be mapped to vectors of real numbers. Thus, the model transforms from a space with many dimensions per word to a continuous vector space with a much lower dimension.

In some embodiments, a ResNet-34 (34-layer residual network) architecture as shown in Table 1 may be used. In Table 1, conv1 may correspond to the first convolution layer 206a, pool1 may correspond to the first pooling layer 206b, rest_block1 to rest_block 4 may correspond to the plurality of residual network layers 206c, conv2 may correspond to the second convolution layer 206d, and pool1 may correspond to the second pooling layer 207. For the output of every convolutional operator, batch normalization, not shown in Table 1, is applied before computing rectified linear unit (ReLU) activations. The parameters of ResNet-34 may be initialized. The embedding size may be set to 512, and the 512-channel parametric ReLU (PReLU) activations may be used as feature embedding. Using PReLU as non-linear activation function has advantages of avoiding canceling correlation in negative dimensions of embedding space like ReLU and strengthening the robustness of embedding feature.

TABLE 1

The ResNet-34 architecture. The triple output size is in the form of (channel × temporal × frequency). [(3 × 3, 64)$_2$] × 3 means 3 residual blocks, each of which comprising 2 convolutional operators, each with kernel size 3 × 3 and 64 filters, others in analogy. For the first block of res_block2 ~ 4 with different numbers of filters between the input and output, a short cut connection is needed, using one convolution with kernel size 1 × 1.

| Layer Name | Configuration | Output Size |
| --- | --- | --- |
| conv1 | (7 × 7, 64), stride 2 | 64 × 148 × 254 |
| pool1 | 3 × 3, max pool, stride 2 | 64 × 73 × 126 |
| res_block1 | [(3 × 3, 64)$_2$] × 3 | 64 × 73 × 126 |
| res_block2 | [(3 × 3, 128)$_2$] × 4 | 128 × 37 × 63 |
| res_block3 | [(3 × 3, 256)$_2$] × 6 | 256 × 19 × 32 |
| res_block4 | [(3 × 3, 512)$_2$] × 3 | 512 × 10 × 16 |
| conv2 | (1 × 9, 512) | 512 × 10 × 8 |
| pool2 | adaptive average pool | 512 × 1 × 1 |
| embedding | 512 × 512, PReLU | 512 → 512 |
| classification | 512 × C, C = 5994 | 512 → 5994 |

In some embodiments, if the model is untrained, the model can be trained at least by jointly minimizing a first loss function and a second loss function. For example, the feature sequence 205 may be fed to the untrained model to train the layers (e.g., from the input layer to the output layer) by minimizing the two loss functions. Minimizing loss function a method of evaluating how well specific algorithm models the given data. If predictions deviate too much from actual results, loss function would cough up a very large number. Gradually, with the help of some optimization function, loss function learns to reduce the error in prediction.

The first loss function (209a for classification) is introduced below. In some embodiments, the first loss function (e.g., Equation (3) below) may be a non-sampling-based loss function. Training the model by minimizing the first loss function optimizes speaker classification. The loss function for classification may be a computationally feasible loss function representing the price paid for inaccuracy of predictions in identifying which category (e.g., speaker identity category) a particular observation (e.g., speech data input) belongs to. The goal of the learning process, often involving labeled datasets, is to minimize expected risk.

In one embodiment, the non-sampling-based loss function comprises an additive margin softmax loss function. A softmax function takes an N-dimensional vector of real numbers and transforms it into a vector of real number in range (0, 1) which add up to 1. The softmax function may be used in the final layer of a neural network-based classifier. Such networks may be trained under a log loss or cross-entropy regime, giving a non-linear variant of multinomial logistic regression. Compared to the original softmax which separates two different classes with a decision boundary line, additive margin softmax separates two different classes with a decision margin (e.g., an angular area).

In some embodiments, minimizing the first loss function comprises, for at least the embedding layer, minimizing a non-sampling-based loss function to optimize between-class classification error. That is, the error of mixing up one class with another is minimized. By the classification error optimization, classes are made further apart (e.g., class spk1 (speaker 1) and class spk3 (speaker 3) of 209a are far apart) and easier to distinguish from one another, thereby reducing the chance for mix-up in applications. In one embodiment, minimizing the first loss function trains the plurality of neuron layers (e.g., from the first convolution layer 206a to the embedding layer 208). This provides one end-to-end framework to train the model, instead of training the first convolution layer 206a to the embedding layer 208 under one model, and training the embedding layer 208 for optimizing classification or clustering under another model.

A softmax loss function for classification is formulated as follows $$\mathcal{L}_{Softmax} = -\frac{1}{N} \sum_{i=1}^{N} \log \frac{e^{w_{y_i}^T x_i}}{\sum_{j=0}^{C-1} e^{w_j^T x_i}}, \quad (1)$$

where N and C are the batch size and the class number respectively. $x_i \in \Re^{d+1}$ is a d+1 dimensional real vector with d dimension embedding of the sample, appended with a scalar 1. $w_j \in \Re^{d+1}$ is the weight vector for class j. The inner product $w_j^T x_i$ can be equivalently expressed in angular form as $\|w_j\|\|x_i\|\cos(\theta_{x_i,w_j})$, where $\theta_{x_i,w_j}$ is the angle between $w_j$ and $x_i$.

Angular softmax introduces a multiplicative margin m on the angle θ. Angular softmax first constrains the weight vector $w_j$ to have unit-norm, i.e., normalize the weights and zero the bias scalar in $w_j (\|w_{j,i<d}\|=1, w_{j,d}=0)$. The inner product becomes $\|x_i\|\cos(\theta_{x_i,w_j})$. It further applies the multiplicative margin as follows $$\mathcal{L}_{AS} = -\frac{1}{N}\sum_{i=1}^{N}\log\frac{e^{\|x_i\|\cos(m\theta_{x_i,w_{y_i}})}}{Zx_i}, \quad (2)$$

$$Zx_i = e^{\|x_i\|\cos(m\theta_{x_i,w_{y_i}})} + \sum_{j=0, j\neq y_i}^{C-1} e^{\|x_i\|\cos(\theta_{x_i,w_j})}.$$

Here, m is applied to the positive label $y_i$ only. For angle $\theta_{x_i,w_{y_i}}$ between $x_i$ and its corresponding label $y_i$ in $$\left(-\frac{\pi}{2m}, \frac{\pi}{2m}\right),$$

choosing m larger than 1.0 reduces the angular distance $\cos(m\theta_{x_i,w_{y_i}})$. When annealing m gradually from 1.0 to a larger value during training, it can force the learned embedding $x_i$ for corresponding label $y_i$ to be more discriminative than trained from softmax.

Instead of using the multiplicative margin m as in Equation (2), additive margin softmax uses an additive margin in angular space. Furthermore, embedding $x_i$ is normalized to be one ($\|x_i\|=1$) and then rescaled by a hyperparameter s. The loss function is as follows $$\mathcal{L}_{AMS} = -\frac{1}{N}\sum_{i=1}^{N}\log\frac{e^{s\psi(\theta_{x_i,w_{y_i}})}}{Zx_i}, \quad (3)$$

$$Zx_i = e^{s\psi(\theta_{x_i,w_{y_i}})} + \sum_{j=0,j\neq y_i}^{C-1} e^{s\cos(\theta_{x_i,w_j})},$$

$\psi(\theta)$ has two forms of definitions. One is defined as $\cos\theta - m$ for additive cosine margin softmax, i.e., Cos AMS. The second is $\cos(\theta+m)$ for additive angle margin softmax, i.e., ArcAMS. Increasing m would result in reduced posterior in Equation (3) as cosine function is monotonically decreasing, therefore forcing $x_i$ to be more discriminative. Additionally, s can be considered as a temperature parameter for annealing. Using a large s makes the posterior sharper than using s=1. In some embodiments, the first loss function includes the additive margin softmax loss function $\mathcal{L}_{AMS}$ (Equation 3).

Training models with discriminative loss function such as large margin one may suffer from local optimum or divergence. A current approach to handle this is starting from a pre-trained model with softmax loss, but this can be time-consuming. In some embodiments, the annealing method for training models with additive margin softmax loss is introduced below. In one embodiment, minimizing the first loss function comprises increasing a margin linearly from zero to a target margin value for annealing. The training processes stabilize as one progressive transition for the margin m. The margin m may be increased linearly from 0 to the target margin value as $$m = \min(m_{max}, m_{inc} \times t),$$

where t≥0 is the epoch step. To guarantee numerical stability for the ArcAMS loss, it may be configured to $\psi(\theta)=\cos(\theta+m)$ if $\sin(\theta+m)>0$ (that is, in the upper quadrant of Cartesian coordinated system) or $\psi(\theta)=\cos(\theta)$ if otherwise.

The second loss function (209b for clustering) is introduced below. In some embodiments, the second function may be a Gaussian mixture loss function with non-unit multi-variant covariance matrix. In one embodiment, the non-unit multi-variant covariance matrix comprises a standard deviation diagonal matrix. A covariance matrix is a matrix whose element in the i, j position is the covariance between the $i^{th}$ and $j^{th}$ elements of a random vector.

In some embodiments, training the model by minimizing the second loss function optimizes speaker clustering. The goal of clustering is to group similar data points together without supervision or prior knowledge of nature of the clusters. In some embodiments, the loss function for clustering may be a linear combination of unsupervised representation learning loss and a clustering-oriented loss. See Equations (6) to (8) for more details.

In some embodiments, minimizing the second loss function comprises, for at least the embedding layer, minimizing a Gaussian mixture loss function with non-unit multi-variant covariance matrix to reduce intra-class variation. For Gaussian mixture loss function, each cluster is modelled according to a different Gaussian distribution. Each data point may be generated by any of the distributions with a corresponding probability. By the clustering variation loss optimization, units in the same classes more strongly resemble each other (e.g., class spk1 of 209b is small in size and reflects strong resemblance among its units). In one embodiment, the Gaussian mixture loss function with non-unit multi-variant covariance matrix comprises a large margin Gaussian mixture loss function.

In one embodiment, minimizing the second loss function trains the plurality of neuron layers (e.g., from the first convolution layer 206a to the embedding layer 208). This provides one end-to-end framework to train the model, instead of training the first convolution layer 206a to the embedding layer 208 under one model, and training the embedding layer 208 for optimizing classification or clustering under another model.

In some embodiments, it is assumed that the extracted embedding $x_i$ on the training set is distributed as mixtures of Gaussian densities. Each Gaussian component k has its mean $\mu_k$ and covariance $\Sigma_k$ with prior probability $\pi_k$. If there are C such Gaussian components, a loss $\mathcal{L}_{cls}$ is defined to measure the closeness of the hypothesis of $x_i$ belonging to cluster k and the posterior probability from the Gaussian mixture model. The posterior probability is denoted as $$\gamma_k(y_i) = p(y_i = k | x_i) = \frac{N(x_i, \mu_k, \Sigma k)\pi_k}{\sum_{k=0}^{C-1} N(x_i; \mu_k, \Sigma k)\pi_k}.$$

Aggregating this over all observations gives:

$$\mathcal{L}_{cls} = -\frac{1}{N}\sum_{i=1}^{N}\log\gamma_i(y_i = k). \quad (4)$$

Speaker ID of $x_i$ for $y_i$ and C corresponds to the class number as classification task. Then, in the embedding space, $\mathcal{L}_{cls}$ focuses more on discriminative capability.

However, optimizing the above loss cannot ensure that the obtained embedding $x_i$ fits a mixture of Gaussian distribution. Thus, in some embodiments, a regularization term that explicitly drives the embedding towards a mixture of Gaussian density distribution may be added by introducing a likelihood function as follows $$\mathcal{L}_{likelihood} = -\frac{1}{N}\sum_{i=1}^{N}\log(N(x_i; \mu_{Y_i}, \Sigma_{Y_i})\pi_{Y_i}). \tag{5}$$

Increasing this likelihood can drive the extracted embedding $x_i$ towards its corresponding Gaussian distribution.

In some embodiments, the Gaussian mixture loss $\mathcal{L}_{GM}$ may be defined as $$\mathcal{L}_{GM} = \mathcal{L}_{cls} + \lambda \mathcal{L}_{likelihood}, \tag{6}$$

in which $\lambda$ is a non-negative weighting coefficient. For simplicity, the prior $$\pi_k = \frac{1}{C}$$

and $\Sigma_k$ may be diagonal covariance matrix. $\mathcal{L}_{GM}$ then becomes the following in which constant terms are removed.

$$\mathcal{L}_{GM} = \frac{1}{N}\sum_{i=1}^{N}\left(-\log\frac{|\Sigma_{y_i}|^{-\frac{1}{2}}e^{-d_{x_i,y_i}}}{\sum_{k=0}^{C-1}|\Sigma_k|^{\frac{1}{2}}e^{-d_{x_i,k}}} + \lambda\left(d_{x_i,y_i} + \frac{1}{2}\log|\Sigma_{y_i}|\right)\right), \tag{7}$$

$$d_{x_i,k} = \frac{1}{2}(x_i - \mu_k)^T\sum_{k}^{-1}(x_i - \mu_k)^T$$

In some embodiments, to optimize loss $\mathcal{L}_{GM}$, all of the parameters for Gaussian mixture components, including $\mu_k$ and $\Sigma_k$, and embedding $x_i$ are updated using stochastic gradient descent (SGD) algorithm. Applying diagonal covariance in Equation (7) may have numerical difficulty, because the covariance matrix $\Sigma_k$ needs to be positive semi-definite. In some embodiments, it is defined that $\Sigma_k = \Lambda_k^2$. Instead of $\Sigma_k$, the standard deviation diagonal matrix $\Lambda_k$ is the parameter to learn. $\Lambda_k$ is initialized to be identity matrix.

In some embodiments, when Gaussian component identities are given, it is beneficial to apply margin to improve generalization capability of learned embedding $x_i$. To this end, the distance $d_{x_i,y_i}$ is increased for positive samples with a scalar $1+\alpha_i$, with margin $\alpha$ being larger than zero. The new loss function, large margin Gaussian mixture, is defined as follows $$\mathcal{L}_{LMGM} = \tag{8}$$

$$\frac{1}{N}\sum_{i=1}^{N}\left(-\log\frac{|\Sigma_{y_i}|^{-\frac{1}{2}}e^{-d_{x_i,y_i}(1+\alpha)}}{Zx_i} + \lambda\left(dx_i, y_i + \frac{1}{2}\log|\Sigma_{y_i}|\right)\right),$$

$$Zx_i = \sum_{k=0}^{C-1}|\Sigma_k|^{-\frac{1}{2}}e^{-d}x_i, k(1+\alpha I_{k==y_i}),$$

where $I_{cond}$ is an indicator function equal to 1 if cond is satisfied or 0 if otherwise. The loss $\mathcal{L}_{LMGM}$ is more generalized for speaker identification. In some embodiments, the second loss function includes the Gaussian mixture loss function with non-unit multi-variant covariance matrix $\mathcal{L}_{LMGM}$ (Equation 8).

In some embodiments, the first loss function acts as a regularizer to the second loss function, and the second loss function acts as a regularizer to the first loss function. Regularizers allow to apply penalties on layer parameters or layer activity during optimization. These penalties are incorporated in the loss function that the network optimizes. These two loss functions help each other to achieve stable and fast convergence when training embeddings.

In some embodiments, the integral loss function is a combination of classification and clustering loss, represented as the addition of Equation (3) and Equation (8), such as follows $$\text{Loss} = \mathcal{L}_{AMS}\mathcal{L}_{LMGM}. \tag{9}$$

Equation (9) may use $m_{max}=0.2$, $m_{inc}=0.035$, $s=30$ for $\mathcal{L}_{CosAMS}$ loss and $m_{max}=0.25$, $m_{inc}=0.045$, $s=30$ for $\mathcal{L}_{ArcAMS}$ loss. For $\mathcal{L}_{LMGM}$ loss, let $\alpha=0.01$ and $\lambda=0.01$.

In some embodiments, two metrics may be used for model evaluation. The first metrics is Equal Error Rate (EER), defined as the rate at which miss probability $P_{miss}$ is equal to false alarm probability $P_{fa}$, and the second is Minimum Detection Cost Function (minDCF), defined as $C_{det}^{min}=\min(C_{miss} \times P_{miss} \times P_{tar} + C_{fa} \times P_{fa} \times (1-P_{tar}))$, where $C_{miss}$ and $C_{fa}$ are the cost weights of $P_{miss}$ and $P_{fa}$ respectively, and $P_{tar}$ is the target probability. Since $P_{miss}$ and $P_{fa}$ are functions of threshold, the minimum in $C_{det}^{min}$ is computed over all possible thresholds. For example, $C_{miss}=1.0$, $C_{fa}=1.0$, and $P_{tar}=0.01$.

In some embodiments, for training and test. Models are optimized with momentum SGD, which has a momentum of 0.9 and weight decay of $5 \times 10^{-4}$. Mini-batch size is 64. At the beginning of each epoch, training samples are randomly shuffled. The initial learning rate is 0.1 for additive margin softmax loss, including $\mathcal{L}_{CosAMS}$ and $\mathcal{L}_{ArcAMS}$ ones. For additive margin softmax loss and $\mathcal{L}_{LMGM}$, the learning rate is set to 0.01. Learning rate is decayed by 0.1 every 6 epoch. After 12 epochs, training is terminated to avoid overfitting when the Equal Error Rate (EER) is increasing on the validation set. During test, utterances with whole length are used, and the embeddings are extracted with adaptive average pooling in Table 1. As end-to-end deep speaker embedding model, cosine distance is used as backend scoring when evaluating performance.

Figure 2C:
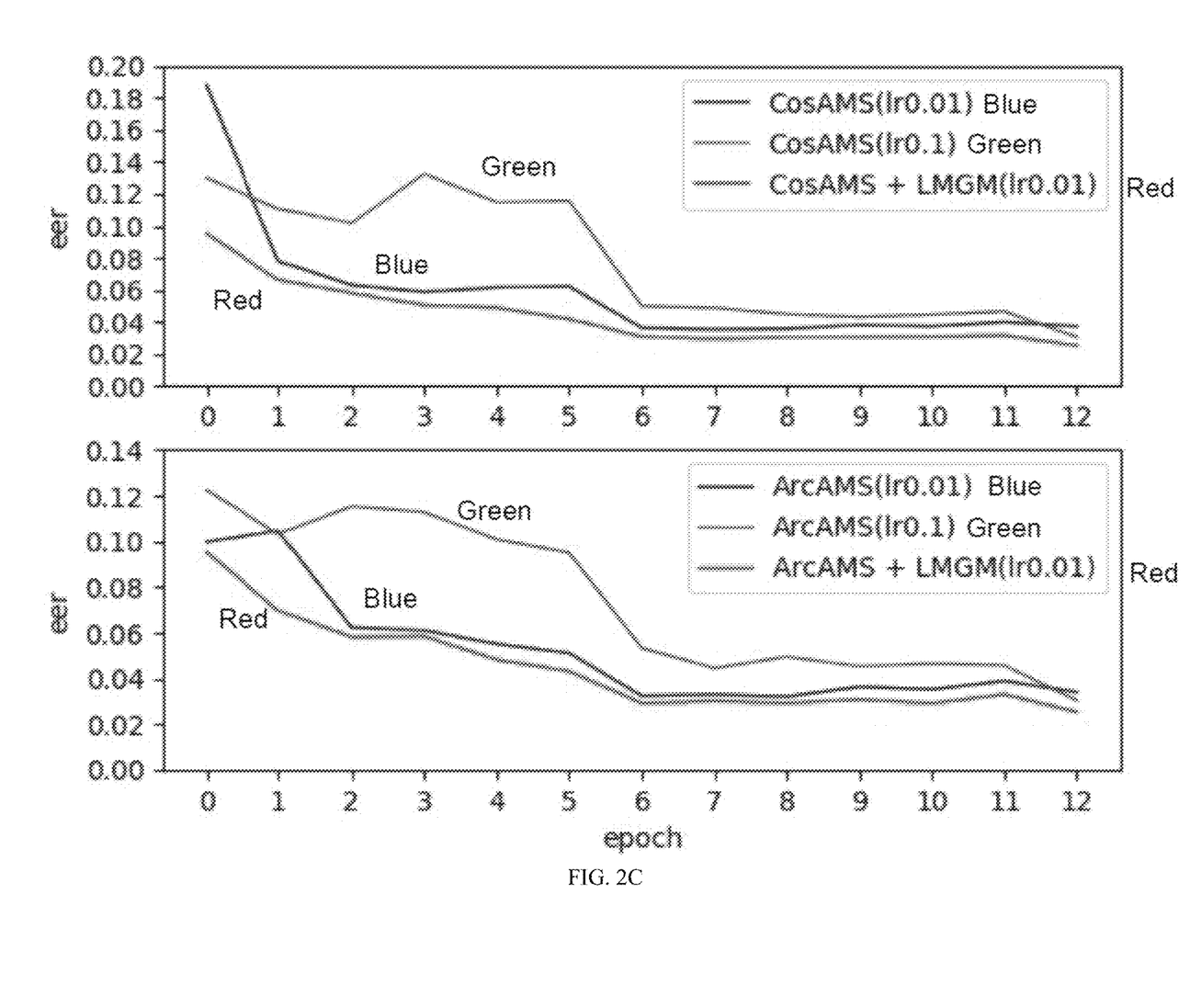
FIG. 2C illustrates an evaluation of Equal Error Rate (EER) in accordance with some embodiments.

In some embodiments, combining classification and clustering improves convergence of model training. Referring to FIG. 2C, the graphs in FIG. 2C show EER changes with respect to training epochs on validation set using different methods. FIG. 2C shows that, in some embodiments, though eventually convergent, additive margin softmax loss may have oscillations of EERs in the beginning of its training. It needs to have a smaller learning rate, but that causes low convergence rate. On the other hand, combining the additive margin softmax loss with large margin Gaussian mixture loss $\mathcal{L}_{LMGM}$ achieves much faster convergence and is more stable, than using additive margin softmax loss alone. For the latter, it uses a learning rate of 0.1, the one that causes oscillation of the EER performance at the early stage of training. Using large learning rate may be beneficial to the proposed method, because the possibility of escaping local optimal saddle points and moving closer to global optimal at later stage.

Referring back to FIG. 1, the inputting component 114 may be configured to input the speech data into the model trained at least by jointly minimizing the first loss function and the second loss function. The training process may be, for example, as described above. In some embodiments, the inputting component 114 may be configured to input the plurality of feature vectors into the trained model. The trained model may include the layers 206a to 208, but with the associated parameters such as the weights trained and fixed. The trained model may have been optimized for classification and clustering.

In some embodiments, the trained model may output one or more voice characteristics of the speaker. The second obtaining component 116 may be configured to obtain from the trained model the one or more voice characteristics of the speaker. The one or more voice characteristics may be represented by the embedding layer output from the model.

In some embodiments, the one or more voice characteristics can be used for many tasks, such as speaker identification, verification, and clustering. In one embodiment, the computing system 102 may be configured to perform the above-described steps for one or more speakers and obtain the one or more voice characteristics for each of the one or more speakers. The voice characteristics of the one or more speakers may be stored for user identification, verification, clustering, etc. In one embodiment of user identification, the computing system 102 may be configured to perform the above-described steps for a candidate user to obtain the one or more voice characteristics for the candidate user (e.g., user 140), compare the one or more voice characteristics of the candidate user with the one or more characteristics of the each of the one or more speakers, and identify whether the candidate user is any of the one or more speakers based at least on the comparison. For instance, the speech data of an employee speaking to a company's security gate may be used to identify the employee's identity and record the employee's work time. In one embodiment of user verification, the computing system 102 may be configured to perform the above-described steps for a candidate user to obtain the one or more voice characteristics for the candidate user, compare the one or more voice characteristics of the candidate user with the one or more characteristics of the speaker, and verify whether the candidate user is the speaker based at least on the comparison. For instance, the speech data of a user speaking to a mobile phone may be used to authenticate the user. If the mobile phone verifies that user is the true owner of the mobile phone, the mobile phone may unlock certain functions for the user.

In some embodiments, to compare the one or more voice characteristics of the candidate user with the one or more characteristics of the each of the one or more speakers, the computing system 102 may be configured to compare, with a threshold, a distance between a vector representing the one or more voice characteristics of the candidate user and a different vector representing the one or more characteristics of the each of the one or more speakers. If the distance is within the threshold for a comparison between the candidate user and speaker A of the one or more speakers, it indicates that the candidate user is likely speaker A. If the distance is not within the threshold for a comparison between the candidate user and speaker A of the one or more speakers, it indicates that the candidate user is unlikely speaker A.

Figure 3:
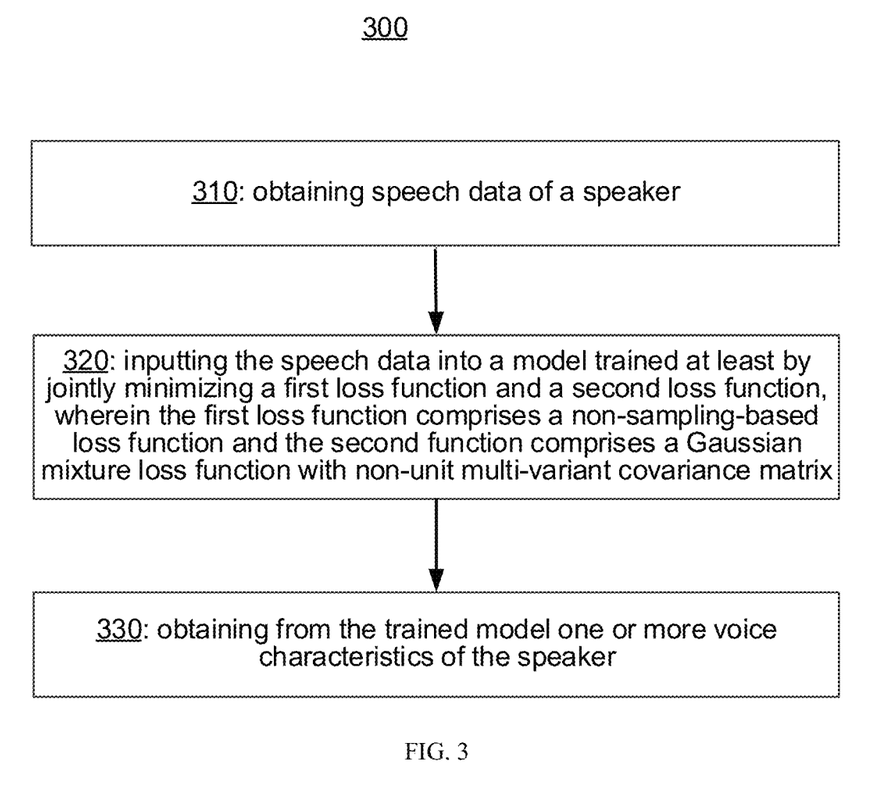
FIG. 3 illustrates a method for determining voice characteristics in accordance with some embodiments.

FIG. 3 illustrates a flowchart of a method 300 for determining voice characteristics in accordance with some embodiments. The method 300 may be performed by a device, apparatus, or system for determining voice characteristics. The method 300 may be performed by one or more components of the environment or system illustrated by FIGS. 1-2C, such as the computing system 102. The operations of the method 300 presented below are intended to be illustrative. Depending on the implementation, the method 300 may include additional, fewer, or alternative steps performed in various orders or in parallel.

Block 310 includes obtaining speech data of a speaker.

Block 320 includes inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix. In some embodiments, obtaining the speech data of the speaker comprises obtaining a spectrogram corresponding to the speech data, and obtaining a plurality of feature vectors corresponding to the spectrogram; and inputting the speech data into the trained model comprises inputting the plurality of feature vectors into the trained model. In some embodiments, the first loss function acts as a regularizer to the second loss function; and the second loss function acts as a regularizer to the first loss function.

In some embodiments, training the model by minimizing the first loss function optimizes speaker classification; and training the model by minimizing the second loss function optimizes speaker clustering. In one embodiment, the non-unit multi-variant covariance matrix comprises a standard deviation diagonal matrix. In one embodiment, the Gaussian mixture loss function with non-unit multi-variant covariance matrix comprises a large margin Gaussian mixture loss function. In one embodiment, the non-sampling-based loss function comprises an additive margin softmax loss function.

In some embodiments, the trained model comprises: a first convolution layer configured to receive the plurality of feature vectors as an input of the first convolution layer; a first pooling layer configured to receive an output of the first convolution layer as an input of the first pooling layer; a plurality of residual network layers configured to receive an output of the first pooling layer as an input of the plurality of residual network layers; a second convolution layer configured to receive an output of the plurality of residual network layers as an input of the second convolution layer; a second pooling layer configured to receive an output of the second convolution layer as an input of the second pooling layer; and an embedding layer configured to receive an output of the second pooling layer as an input of the embedding layer and output a vector representing the one or more voice characteristics of the speaker.

In some embodiments, minimizing the first loss function comprises, for at least the embedding layer, minimizing a non-sampling-based loss function to optimize between-class classification error; and minimizing the second loss function comprises, for at least the embedding layer, minimizing a Gaussian mixture loss function with non-unit multi-variant covariance matrix to reduce intra-class variation.

In some embodiments, minimizing the first loss function comprises increasing a margin linearly from zero to a target margin value for annealing.

Block 330 includes obtaining from the trained model one or more voice characteristics of the speaker.

In some embodiments, the method 300 further comprises: obtaining the one or more voice characteristics for each of one or more speakers; obtaining the one or more voice characteristics for a candidate user; comparing the one or more voice characteristics of the candidate user with the one or more characteristics of the each of the one or more speakers; and identifying whether the candidate user is any of the one or more speakers based at least on the comparison. Alternatively, the method 300 further comprises: obtaining the one or more voice characteristics for a candidate user; comparing the one or more voice characteristics of the candidate user with the one or more characteristics of the speaker; and verifying whether the candidate user is the speaker based at least on the comparison.

In some embodiments, comparing the one or more voice characteristics of the candidate user with the one or more characteristics of the each of the one or more speakers comprises: comparing, with a threshold, a distance between a vector representing the one or more voice characteristics of the candidate user and a different vector representing the one or more characteristics of the each of the one or more speakers.

Figure 4:
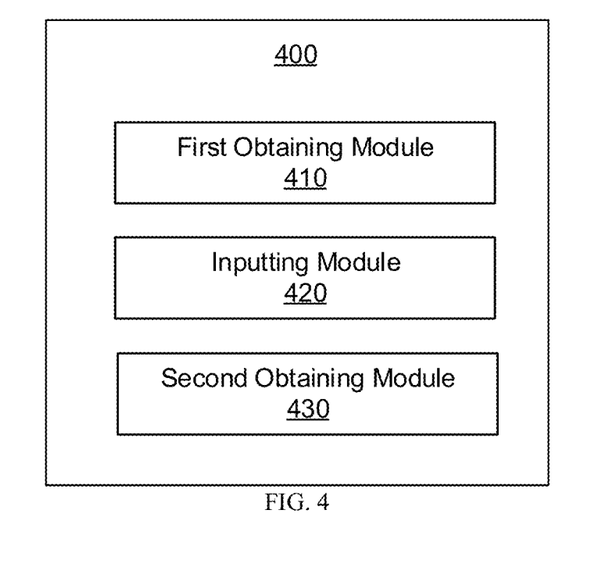
FIG. 4 illustrates a block diagram of a computer system for determining voice characteristics in accordance with some embodiments.

FIG. 4 illustrates a block diagram of a computer system 400 apparatus for determining voice characteristics in accordance with some embodiments. The components of the computer system 400 presented below are intended to be illustrative. Depending on the implementation, the computer system 400 may include additional, fewer, or alternative components.

The computer system 400 may be an example of an implementation of one or more components of the computing system 102. The method 300 may be implemented by the computer system 400. The computer system 400 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 300. The computer system 400 may comprise various units/modules corresponding to the instructions (e.g., software instructions).

In some embodiments, the computer system 400 may be referred to as an apparatus for determining voice characteristics. The apparatus may comprise a first obtaining module 410 for obtaining speech data of a speaker; an inputting module 420 for inputting the speech data into a model trained at least by jointly minimizing a first loss function and a second loss function, wherein the first loss function comprises a non-sampling-based loss function and the second function comprises a Gaussian mixture loss function with non-unit multi-variant covariance matrix; and a second obtaining module 430 for obtaining from the trained model one or more voice characteristics of the speaker. The first obtaining module 410 may correspond to the first obtaining component 112. The inputting module 420 may correspond to the inputting component 114. The second obtaining module 430 may correspond to the second obtaining component 116.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 5:
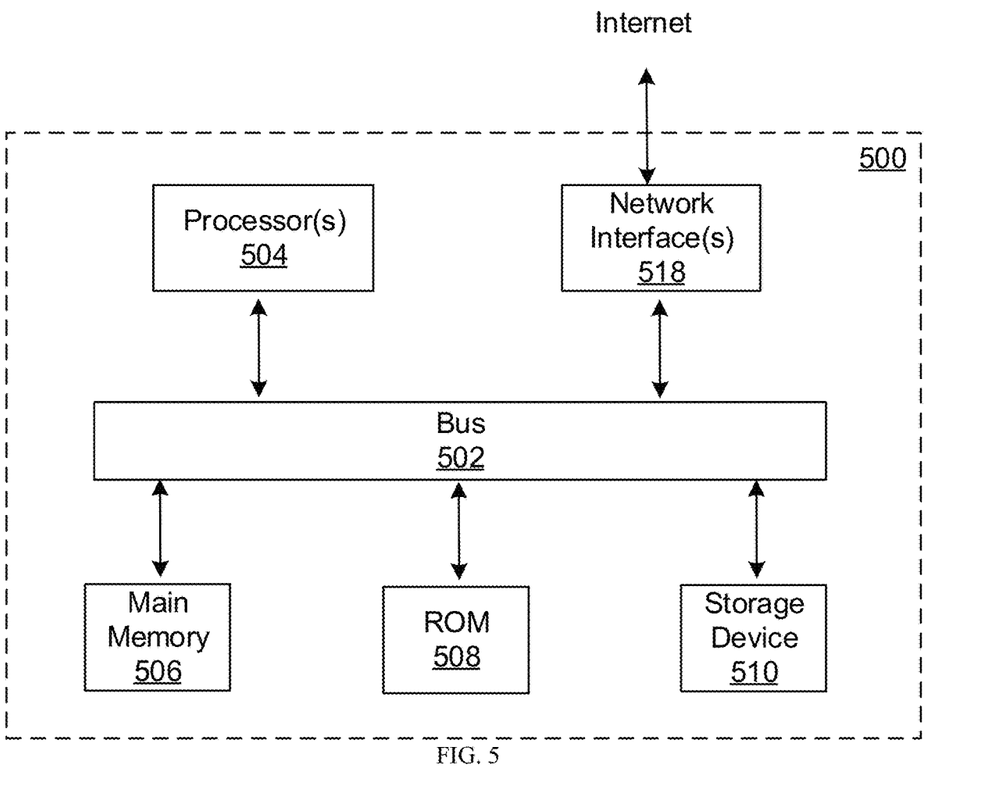
FIG. 5 illustrates a block diagram of a computer system in which any of the embodiments described herein may be implemented.

FIG. 5 illustrates a block diagram of a computer system 500 in which any of the embodiments described herein may be implemented. The computer system 500 may be implemented in any of the components of the devices, apparatuses, or systems illustrated in FIGS. 1-4, such as the computing system 102. One or more of the methods illustrated by FIGS. 1-4, such as the method 300, may be performed by one or more implementations of the computer system 500.

The computer system 500 may include a bus 502 or other communication mechanism for communicating information, one or more hardware processor(s) 504 coupled with bus 502 for processing information. Hardware processor(s) 504 may be, for example, one or more general purpose microprocessors.

The computer system 500 may also include a main memory 506, such as a random-access memory (RAM), cache and/or other dynamic storage devices, coupled to bus 502 for storing information and instructions executable by processor(s) 504. Main memory 506 also may be used for storing temporary variables or other intermediate information during execution of instructions executable by processor(s) 504. Such instructions, when stored in storage media accessible to processor(s) 504, render computer system 500 into a special-purpose machine that is customized to perform the operations specified in the instructions. The computer system 500 may further include a read only memory (ROM) 508 or other static storage device coupled to bus 502 for storing static information and instructions for processor(s) 504. A storage device 510, such as a magnetic disk, optical disk, or USB thumb drive (Flash drive), etc., may be provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 may cause processor(s) 504 to perform the process steps described herein. In alternative embodiments, hard-wired circuitry may be used in place of or in combination with software instructions.

The main memory 506, the ROM 508, and/or the storage device 510 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 may include a network interface 518 coupled to bus 502. Network interface 518 may provide a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 may send and receive electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method for determining voice characteristics, comprising:
 obtaining speech data of a speaker;
 inputting the speech data into a model trained at least by jointly minimizing a first loss function and a second loss function, wherein the first loss function comprises a non-sampling-based loss function and the second loss function comprises a Gaussian mixture loss function with non-unit multi-variant covariance matrix; and
 obtaining from the trained model one or more voice characteristics of the speaker.

2. The method of claim 1, wherein:
 training the model by minimizing the first loss function optimizes speaker classification; and
 training the model by minimizing the second loss function optimizes speaker clustering.

3. The method of claim 1, wherein:
 the non-unit multi-variant covariance matrix comprises a standard deviation diagonal matrix.

4. The method of claim 1, wherein:
 the Gaussian mixture loss function with non-unit multi-variant covariance matrix comprises a large margin Gaussian mixture loss function.

5. The method of claim 1, wherein:
 the non-sampling-based loss function comprises an additive margin softmax loss function.

6. The method of claim 1, wherein:
 the first loss function acts as a regularizer to the second loss function; and
 the second loss function acts as a regularizer to the first loss function.

7. The method of claim 1, further comprising:
 obtaining the one or more voice characteristics for each of one or more speakers;
 obtaining the one or more voice characteristics for a candidate user;
 comparing the one or more voice characteristics of the candidate user with the one or more voice characteristics of the each of the one or more speakers; and
 identifying whether the candidate user is any of the one or more speakers based at least on the comparison.

8. The method of claim 1, further comprising:
 obtaining the one or more voice characteristics for a candidate user;
 comparing the one or more voice characteristics of the candidate user with the one or more voice characteristics of the speaker; and
 verifying whether the candidate user is the speaker based at least on the comparison.

9. The method of claim 7, wherein:
 comparing the one or more voice characteristics of the candidate user with the one or more voice characteristics of the each of the one or more speakers comprises: comparing, with a threshold, a distance between a vector representing the one or more voice characteristics of the candidate user and a different vector representing the one or more voice characteristics of the each of the one or more speakers.

10. The method of claim 1, wherein:
 obtaining the speech data of the speaker comprises obtaining a spectrogram corresponding to the speech data, and obtaining a plurality of feature vectors corresponding to the spectrogram; and
 inputting the speech data into the trained model comprises inputting the plurality of feature vectors into the trained model.

11. The method of claim 10, wherein the trained model comprises:
 a first convolution layer configured to receive the plurality of feature vectors as an input of the first convolution layer;
 a first pooling layer configured to receive an output of the first convolution layer as an input of the first pooling layer;
 a plurality of residual network layers configured to receive an output of the first pooling layer as an input of the plurality of residual network layers;
 a second convolution layer configured to receive an output of the plurality of residual network layers as an input of the second convolution layer;
 a second pooling layer configured to receive an output of the second convolution layer as an input of the second pooling layer; and
 an embedding layer configured to receive an output of the second pooling layer as an input of the embedding layer and output a vector representing the one or more voice characteristics of the speaker.

12. The method of claim 11, wherein:
 minimizing the first loss function comprises, for at least the embedding layer, minimizing a non-sampling-based loss function to optimize between-class classification error; and
 minimizing the second loss function comprises, for at least the embedding layer,
 minimizing a Gaussian mixture loss function with non-unit multi-variant covariance matrix to reduce intra-class variation.

13. The method of claim 1, wherein:
 minimizing the first loss function comprises increasing a margin linearly from zero to a target margin value for annealing.

14. A non-transitory computer-readable storage medium storing instructions executable by one or more processors, wherein execution of the instructions causes the one or more processors to perform operations comprising:
 obtaining speech data of a speaker;
 inputting the speech data into a model trained at least by jointly minimizing a first loss function and a second loss function, wherein the first loss function comprises a non-sampling-based loss function and the second loss function comprises a Gaussian mixture loss function with non-unit multi-variant covariance matrix; and
 obtaining from the trained model one or more voice characteristics of the speaker.

15. The non-transitory computer-readable storage medium of claim 14, wherein:
 training the model by minimizing the first loss function optimizes speaker classification; and
 training the model by minimizing the second loss function optimizes speaker clustering.

16. The non-transitory computer-readable storage medium of claim 14, wherein:
 the non-unit multi-variant covariance matrix comprises a standard deviation diagonal matrix.

17. The non-transitory computer-readable storage medium of claim 14, wherein:
 the Gaussian mixture loss function with non-unit multi-variant covariance matrix comprises a large margin Gaussian mixture loss function.

18. The non-transitory computer-readable storage medium of claim 14, wherein:
the non-sampling-based loss function comprises an additive margin softmax loss function.

19. The non-transitory computer-readable storage medium of claim 14, wherein:
the first loss function acts as a regularizer to the second loss function; and
the second loss function acts as a regularizer to the first loss function.

20. A system comprising one or more processors and one or more non-transitory computer-readable memories coupled to the one or more processors and configured with instructions executable by the one or more processors to cause the system to perform operations comprising:
obtaining speech data of a speaker;
inputting the speech data into a model trained at least by jointly minimizing a first loss function and a second loss function, wherein the first loss function comprises a non-sampling-based loss function and the second loss function comprises a Gaussian mixture loss function with non-unit multi-variant covariance matrix; and
obtaining from the trained model one or more voice characteristics of the speaker.

* * * * *